Patented Sept. 8, 1931

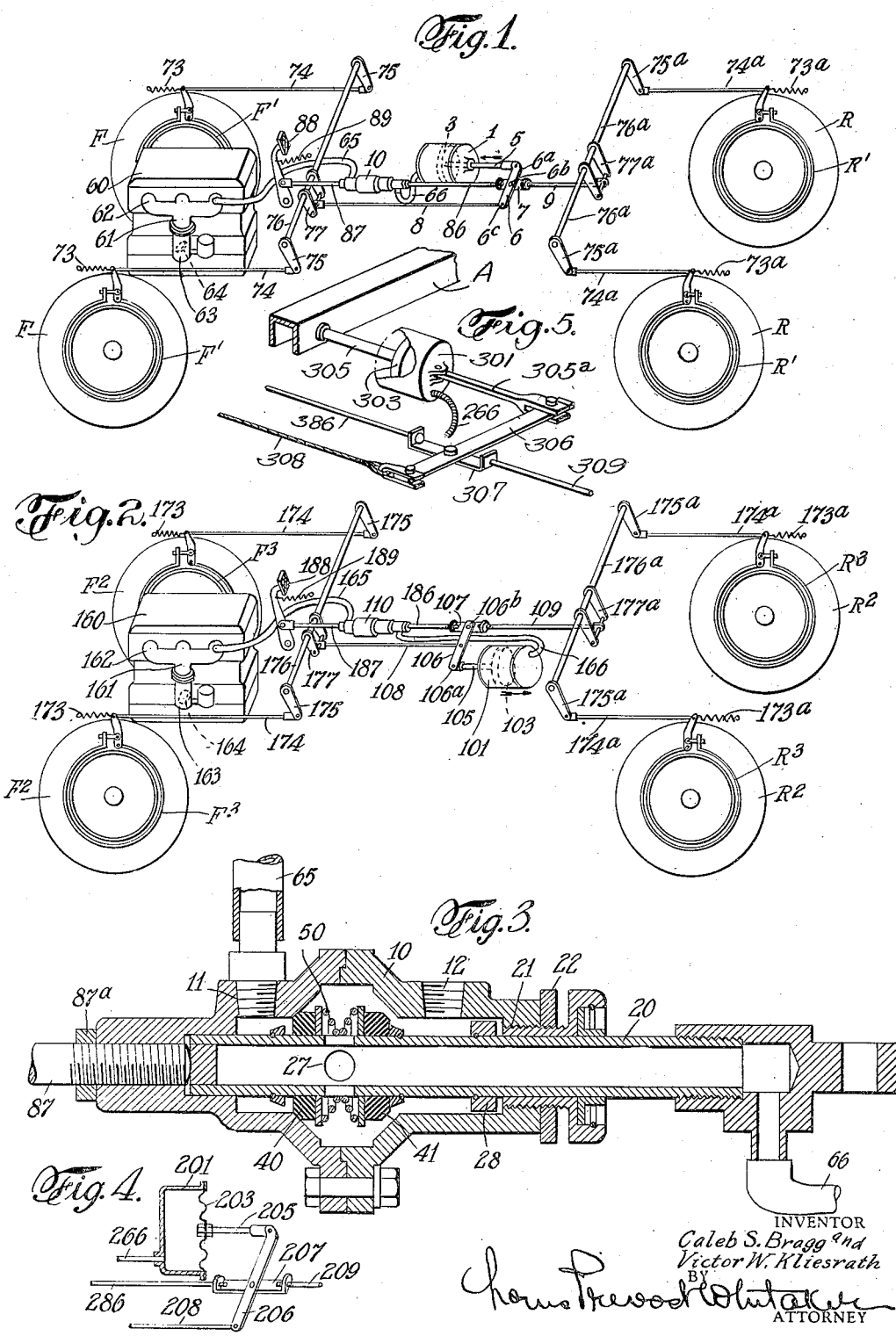

1,822,688

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE MECHANISM FOR AUTOMOTIVE VEHICLES

Application filed October 8, 1927, Serial No. 224,841. Renewed January 15, 1930.

Our invention consists in the novel features hereinafter described, reference being had to the accompanying drawings, which illustrate one embodiment and a slight modification thereof, selected by us for purposes of illustration, and the said invention is fully disclosed in the following description and claims.

Where brake mechanisms are provided for a plurality of pairs of wheels of an automotive vehicle, including the power driven wheels, usually the rear wheels, and the front wheels, usually the steering wheels of the vehicle, it is customary to so arrange the relative sizes of the brakes, or the leverages between them and the operating means, that the front wheel brakes cannot be locked on the average dry pavement or roadway when the brake mechanisms are applied, as the locking of the front wheels materially affects the steering of the vehicle, and is more likely to cause serious accident than the locking of the rear wheels. As the greater portion of the load carried by the vehicle is borne by the rear wheels, it necessarily follows that more power is required to lock the rear wheels when the vehicle is loaded than when empty, and as only a relatively small proportion of the load is carried on the front wheels, it requires relatively but a small amount of additional power to lock the front wheels when the vehicle is loaded than is required when the vehicle is empty. With such an arrangement it necessarily follows that a very small proportion of the braking power can be transmitted to the brakes of the front wheels, and, therefore, the front wheels have comparatively little braking effect in making the ordinary or average stops, and the brake mechanisms of the front wheels only become effective in emergency stops, at which times the rear wheels of the vehicle will often be locked, at which times their braking effect is materially reduced and will more than offset the gain in the braking effect exerted by the front wheels.

The object of our invention is to provide brake mechanism for a plurality of pairs of wheels of an automotive vehicle, all of which are simultaneously applied by a power actuator, comprising one cylinder and a single piston, operatively connected with the brake mechanisms for all the wheels, and preferably operated by a substantially constant differential of fluid pressures, such as the differential of pressures between a partial vacuum obtained by a connection to the intake manifold of the internal combustion engine for propelling the vehicle between the throttle valve and the engine cylinders, the degree of rarification being constant when the throttle valve is closed, which is its correct position when the brakes are to be applied, and atmospheric pressure, for example, the capacity of the actuator, or the leverages in the connections between its piston and the brake mechanisms for the front wheels being so arranged that the front wheels cannot be locked upon the average dry pavement or roadway, the piston being also connected with the brake mechanism for the rear wheels which are simultaneously operated so they preferably cannot be locked even when the vehicle is lightly loaded on the average dry pavement, means being provided whereby the physical force of the operator may be added to the brake mechanism for the rear wheels only to assist the operator in stopping the vehicle when heavily loaded or in making emergency stops, or to apply the brakes for the rear wheels should the source of power fail.

In the operation of brake mechanism embodying our invention, the average stop of the vehicle is made by power alone without the possibility of locking either the front wheels or the rear wheels on the average pavement when dry, as the front brakes are operated by a constant maximum power, a larger proportion of the amount of braking is effected by the front wheels brake mechanism than is effected with the customary linkage previously described, as the full braking power of the actuator may be transmitted to the front wheels simultaneously with the rear, the physical force of the operator being applied only for emergency stops or excessive loads, and in such cases being applied only to the rear wheels. In the operation of brake mechanism embodying our invention, the vehicle may be stopped more quickly with less danger of locking the wheels even on wet pavements, and longer wear of the brakes and tires will necessarily result.

In the accompanying drawings,

Fig. 1 is a diagrammatic view showing an installation of brake mechanism embodying our present invention in an automotive vehicle provided with an internal combustion engine for propelling the vehicle, and having brake mechanism for four wheels normally operated by an actuator under the control of an operator operated part adapted to be directly connected with the rear wheel brake mechanism.

Fig. 2 is a similar diagrammatic view showing a different arrangement of the actuator and its connections.

Fig. 3 is a sectional view, showing one form of valve mechanism for controlling the actuator, which is conveniently located in the connections between the operator operated part and the brake mechanism for the rear wheels.

Fig. 4 is a detail sectional view of a modified form of actuator which may be employed in carrying our invention into effect.

Fig. 5 is a fragmentary diagram showing a further modified form of the invention.

Referring to the diagram, Fig. 1, which illustrates an installation of brake mechanism in an automotive vehicle embodying our invention, 60, represents the internal combustion engine for propelling the vehicle, having the usual suction passage, comprising the vertical portion, 61, and the intake manifold, 62, for supplying the charges to the cylinders of the engine from the carburetor, 63, under the control of the usual throttle valve, 64, interposed between the carburetor and the cylinders of the engine. The front wheels of the vehicle are indicated at F, F, and the rear wheels at R, R, the front wheels being provided with brake mechanism, indicated diagrammatically at $F^1$, $F^1$, and the rear wheels being provided with brake mechanisms indicated at $R^1$, $R^1$, which brake mechanisms may be of any desired type. The front wheel brake mechanisms are provided with retracting springs, 73, and are connected by links, 74, 74, with arms, 75, 75, on a rock shaft, 76, provided with an actuating arm, or arms, 77, and the brake mechanisms for the rear wheels being shown provided with retracting springs, 73a, and connected by links, 74a, with arms, 75a, on a rock shaft, 76a, provided with an actuating arm, or arms, 77a.

A power actuator is suitably mounted on the chassis of the vehicle, and in this instance we have shown a simple form of power actuator comprising a cylinder, 1 closed at one end and open to the atmosphere at the other end and provided with a piston, 3, having a piston rod, 5, movable in the direction of the arrow, Fig. 1, which is pivotally connected to one end, 6a, of a brake applying lever, 6, pivoted at 6b, to a fulcrum yoke, 7, and having its opposite end, 6c, connected preferably by a cable, 8, with the actuating arm or arms, 77, of the front wheel brakes, the fulcrum yoke, 7, being connected by a link, 9, with the actuating arm, or arms, 77a, of the rear wheel brakes. The effective movement arms of the lever, 6, between the fulcrum yoke and the respective ends, 6a and 6b, of the lever, 6, are so proportioned as to apply the desired braking force to the front wheels and rear wheels, and the parts will be so constructed that the power of the actuator will be applied to all of said brake mechanisms simultaneously to a predetermined extent as to each, and at the same time to prevent the locking of any of the wheels on a normal dry roadway by the application of the maximum power of the actuator. The leverages by which the power of the actuator piston is applied to the front wheel brakes and to the rear wheel brakes, or brakes other than the front wheel brakes may be calculated so as to apply the desired maximum pressure to each. In the arrangement indicated in Fig. 1 the leverage favors the rear wheel brake mechanisms, which will receive a larger amount of the power of the actuator than the front wheel brake mechanisms. In the arrangement illustrated in Fig. 2, the connections of the lever with the piston, 103, of the power actuator ond the linkages, 108 and 109, extending from the lever, 106, to the front and rear wheel brakes, respectively, are so constructed as to favor the brake mechanisms for the front wheels, which may be necessary or desirable in some cases due to a difference in the size or efficiency of the brake mechanisms for the front and rear wheels. Obviously any desired leverage ratios can be obtained in order that just the correct amount of braking force shall be exerted by the front wheel brake mechanisms with relation to the amount desired for the rear wheel brake mechanisms exclusive of the application of the physical strength of the operator, so that the power actuator will apply all the brakes simultaneously for an ordinary stop with the desired and predetermined braking force applied to each wheel without locking any of the wheels under the maximum force of which the power actuator is capable.

In carrying out our invention it is desirable that the maximum effective force of the power actuator shall be substantially constant, and we prefer to operate the piston by a constant differential of fluid pressures obtained by rarification or partial vacuum, for example, by connection with the suction passage of an internal combustion engine, the rarification being constant when the throttle valve is closed, which is the correct position when the brakes are to be applied, and the higher fluid pressure of substantially constant pressure, for example, atmospheric pressure. In the present instance we have shown means for connecting the portion of the cylinder between the piston and the closed end of the cylinder, with the suction passage of the engine, and with the atmosphere under the control of valve mechanism, which in this instance is of the kind shown in our former application for Letters Patent of the United States filed March 13, 1926, and given Serial No. 94,412. The particular form of valve mechanism does not form part of our present invention, but to facilitate the understanding of the invention, the valve mechanism is illustrated in detail in Fig. 3, and will be briefly described.

The valve mechanism illustrated in Fig. 3 comprises a valve casing provided with an aperture, 11, connected by a suction pipe, 65, with the intake manifold, 62, of the engine, or other portion of the suction passage between the throttle valve and the engine cylinder, and having an aperture, 12, adapted to communicate with the source of higher pressure, as the atmosphere. Within the valve casing are the suction valve, 40, and air inlet valve, 41, disposed oppositely to each other and mounted on a valve actuating part, 20, in the form of a hollow sleeve, said valves being provided with yielding means, as a spring or springs, 50, for pressing them in a direction toward their seat, and being connected with the sleeve, 20, which is longitudinally movable with respect to the valve seat, so that a movement of the sleeve in either direction with respect to the casing, will open one of the valves after permitting the other to close, the normal position of the sleeve with respect to the casing holding the air inlet valve, 41, open to establish communication between the higher pressure inlet port, 12, and the cylinder of the actuator forward of the piston through an aperture, 27, in the sleeve, 20, communicating with the valve casing between the valves and the flexible pipe or connection, indicated at 66, connecting the hollow sleeve, 20, with the cylinder, a portion of the suction pipe, 65, being also flexible. This form of valve mechanism can be very conveniently installed in linkage between an operator operated part, as the foot pedal, 88, shown in Fig. 1, and brake mechanism of the vehicle, the flexible pipe connection permitting the necessary longitudinal movement of the valve casing. In this instance we have shown the lever, 88, connected by a link rod, 87, with the valve casing, 10, and the sleeve, 20, connected by a link rod, 86, with the fulcrum yoke, 7, thereby connecting it with the link rod, 9, the rear end of which is connected with the brake mechanism other than the front wheel brake mechanism, in this instance the rear wheel brake mechanisms, $R^1$, $R^1$. A limited amount of lost motion is provided between the valve casing, 10, and the valve actuating sleeve, 20, sufficient to permit of the operation of the valves. This is provided in the present instance by means of a collar, 28, on the valve sleeve, 20, which is adapted to engage an adjustable sleeve, 21, on the rear end of the valve casing, with a lock nut, 22, for holding it in adjusted position, and the valve sleeve, 20, engages the rod, 87, adjustably screwed into the valve casing with a lock nut, 87a, for holding it in adjusted position.

In effecting a normal application of the brake mechanism, the operator will place his foot on the pedal lever, 88, and move it forward, thereby moving the valve casing forward with respect to the valve actuating sleeve, 20, sufficiently to permit the valve, 41, to close, and the suction valve, 40, to open, thereby connecting the cylinder forward of the piston with the suction passage of the engine, exhausting the air from the cylinder and permitting atmospheric pressure on the rear face of the piston to move it in the direction of the arrow, Fig. 1, thus drawing forward on the link rod, 9, and rearward on the link or cable, 8, and applying all the brake mechanism by the power of the actuator, to the predetermined extent as to each, without locking any of the wheels of the vehicle. The pedal lever will move forward as the brakes are applied and the operator can arrest the movement of the piston and hold the brakes as applied by stopping the movement of the pedal lever and valve casing, permitting the piston to move the valve sleeve forward until the suction valve, 40, closes, shutting off the source of power without permitting the air inlet valve, 41, to open. The operator may also by exerting his physical force on the pedal lever sufficiently to bring the sleeve, 21, of the casing into contact with the collar, 28, on the valve sleeve, apply his physical force to the brake mechanisms for other than the front wheel brakes, as the rear wheel brake mechanisms in Fig. 1, in addition to power of the actuator, and this may often be necessary when the vehicle is heavily loaded or for making emergency stops. In like manner the operator may apply his physical force to the brake mechanism connected therewith, in this instance the rear wheel brake mechanism, to apply said brake mechanism by physical force alone in case of failure of power, but the physical force of the operator may not be applied to the brake mechanism for the front wheels, which cannot be locked under any circumstances, on normal dry roadways. The flexible cable, 8, will sag when the operator applies the brakes with his physical force, which will permit the arm, 6, to move forward without the necessity of moving the piston and the cylinder.

When the brake mechanisms have been applied by the actuator, they may be released simultaneously by the operator removing his foot from the pedal lever, or releasing the same so as to permit it to be retracted by its spring, 89, and move the valve casing rearwardly with respect to the valve actuating sleeve, 20, to effect the closing of the suction valve and the opening of the air inlet valve, admitting the air or other higher pressure fluid to the cylinder forward of the piston to equalize pressures on opposite faces of the piston, and permit an immediate release of the brake mechanisms simultaneously, and their return to normal or off position under the action of their usual retracting means, with which the brake mechanisms are ordinarily provided, as the retracting springs, 73 and 73a.

In Fig. 2 we have shown, diagrammatically, a slightly modified embodiment of our invention, in which the front wheels are indicated by F2, their brake mechanisms by F3, the rear wheels by R2, and their brake mechanisms by R3, and the other corresponding parts are indicated by corresponding numerals to which 100 has been added. In this installation the actuator cylinder, 101, is installed on the opposite side of the center of the vehicle, and arranged so that its piston moves rearwardly to apply the brake mechanisms, the piston rod, 105, being connected to one end, 106a, of the lever, 106, the other end, 106b, of which is connected to the fulcrum yoke, 107, connected with the rear wheel brake mechanisms, and with the valve actuating sleeve of the controlling valve mechanism for the actuator, the lever, 106, being connected intermediate its ends, preferably by a cable, 108, with the front wheel brake mechanism, and the leverages by which the power of the actuator is applied to the brake mechanisms being such that a greater portion of the power will be applied to the front wheel brake mechanisms than to the rear wheel brake mechanisms. The operation of the apparatus shown in Fig. 2 will be the same as that previously described, and will be effective of the same results.

It will be obvious that if the piston of the actuator were stationarily connected with the chassis of the vehicle, and the cylinder were connected with the brake mechanism in the same manner as the piston is connected in Figs. 1 and 2 the drawings, our invention would function equally well and the same results would be secured. Such a construction is disclosed in Fig. 5 in which the parts corresponding to those illustrated in Fig. 1 are given the same reference characters with the addition of 300. In this form of device A diagrammatically illustrates the chassis, 301 the cylinder, 303 the piston, and 305 the piston rod. As shown the piston rod 305 is connected directly and rigidly to the chassis and the cylinder has connection with the brake applying lever 306 by a coupling rod 305a.

The brake applying lever is pivoted intermediate its length to the yoke member 307 which is connected to the brake mechanism of the rear wheels by the link 309 and to the link 386 which couples this yoke with the valve sleeve 20. The outer end of the lever 306 is connected to the front wheel brake mechanism by the link or cable 308. The flexible pipe 266 couples the actuator with the valve actuating sleeve 20 in a manner similar to that disclosed in Fig. 3. In this form of device the cylinder instead of the piston as in Fig. 1, moves and produces an actuation of the brakes.

It will also be understood that our invention will operate as well with compressed air, steam or other higher pressure fluid at a pressure above atmospheric, acting against either suction, or atmospheric pressure, or with any other source of suction available on an automotive vehicle, as for example a condenser for steam in the case of a vehicle driven by steam.

It will also be noted that the connections between the brake mechanisms and the brake applying lever, 6, (or 106), which may be termed a floating lever, in that it is not connected to any stationary part of the chassis, provides for a predetermined power distribution between the front and rear wheel brake mechanisms and that each set of brake mechanisms will therefore always receive its predetermined percentage of the power of the actuator, regardless of the wear of the braking surfaces. It will also be obvious that when the operator adds his physical strength to the brake mechanisms for the rear wheels, the rod connected with the foot pedal moves forward a distance, as from one half inch to an inch for example, and the piston or cylinder of the actuator is also moved in the direction of its stroke, but the additional force exerted by the operator will be applied only to the rear wheel brake mechanisms, and the front wheel brake mechanisms will not receive more power than can be applied by the piston.

It is obvious that our invention may be carried into effect in connection with other forms of actuator than that shown in Figs. 1 and 2. For example, we may in some instances employ an actuator in which a diaphragm is employed instead of a piston, as indicated for example in Fig. 4, in which corresponding parts to those shown in Fig. 1 are given the same reference numerals with the addition of 200. As indicated in this figure the actuator comprises a cylinder or casing, 201, provided with a diaphragm, 203, connected by a rod, 205, with one end of the lever, 206, the opposite end of which is connected by rod, 208, with the front wheel brakes, the lever being provided with a yoke, 207, interposed between the link, 209, extending to the rear wheel brake mechanism, and the link, 286, connected with the valve mechanism and the foot pedal or other operator operated part in the same manner as indicated in Fig. 1. It will be understood that the cylinder, 201, will be connected by the flexible pipe, 266, with the atmosphere or with the suction passage of the engine under the control of the valve mechanism in the same manner as shown for example in Fig. 1, and the operation of the mechanism will be exactly the same as hereinbefore described.

What we claim and desire to secure by Letters Patent is:—

1. In brake mechanism for an automotive vehicle provided with an internal combustion engine having a throttle controlled suction passage, the combination of brake mechanisms for a plurality of pairs of wheels of the vehicle including the steering wheels, a power actuator comprising a cylinder, a single piston therein, and controlling valve mechanism, means for connecting the cylinder on one side of the piston with the suction passage of the engine, and with a source of higher pressure under the control of said valve mechanism, means for connecting the piston of the actuator with all of said brake mechanisms, constructed to apply the power of the actuator to all of said brake mechanisms simultaneously to a predetermined extent as to each, an operator operated part connected with said controlling valve mechanism, and operatively connected with the brake mechanisms for wheels other than the steering wheels, to enable the operator to apply his physical force to the brake mechanisms connected with the operator operated part in addition to that of the power actuator, and to apply said brake mechanisms by physical force alone in case of failure of power without applying his physical force to the brake mechanisms for the steering wheels.

2. In brake mechanism for an automotive vehicle provided with an internal combustion engine having a throttle controlled suction passage, the combination of brake mechanisms for a plurality of pairs of wheels of the vehicle including the steering wheels, a power actuator comprising a cylinder, a single piston therein, and controlling valve mechanism, means for connecting the cylinder on one side of the piston with the suction passage of the engine, and with a source of higher pressure under the control of said valve mechanism, link and lever connections for connecting said piston with all of said brake mechanisms, the leverage of said connections for the steering wheel brake mechanisms and for the other of said brake mechanisms being arranged to effect the simultaneous application of all of said connected brake mechanisms to a predetermined extent as to each, an operator operated part, connected with the controlling valve mechanism for the actuator, and means for operatively connecting said operator operated part with the brake mechanisms other than the steering wheel brake mechanisms to permit the operator to apply his physical force to the brake mechanisms connected with the operator operated part, in addition to that of the actuator, or to apply said brake mechanisms by physical force alone in case of failure of power, without applying his physical force to the brake mechanism for the steering wheels.

3. In brake mechanism for an automotive vehicle provided with an internal combustion engine having a throttle controlled suction passage, the combination of brake mechanisms for a plurality of pairs of wheels of the vehicle including the steering wheels, a power actuator comprising a cylinder, a single piston therein, and controlling valve mechanism, means for connecting the cylinder on one side of the piston with the suction passage of the engine, and with a source of higher pressure under the control of said valve mechanism, a power applying lever, connected with said actuator piston, linkages connected at different points longitudinally of said lever, and extending in opposite directions to the steering wheels brake mechanisms and the brake mechanisms for the other wheels, said parts being constructed to apply the power of the actuator to all the connected brake mechanisms simultaneously to a predetermined extent as to each, an operator operated part connected with the valve mechanism of the actuator, and means for connecting the operator operated part with the brake mechanisms for wheels other than the front wheels to enable the operator to apply his physical force to the brake mechanisms connected with the operator operated part, in addition to that of the actuator to compensate for increasing loads of the vehicle, or to apply said brake mechanisms by physical force alone in case of failure of power, without applying his physical force to the steering wheel brake mechanisms.

4. In brake mechanism for an automotive vehicle provided with an internal combustion engine having a throttle controlled suction passage, the combination of brake mechanisms for a plurality of pairs of wheels of the vehicle including the steering wheels, a power actuator comprising a cylinder, a single piston therein, and controlling valve mechanism, means for connecting the cylinder on one side of the piston with the suction passage of the engine, and with a source of higher pressure under the control of said valve mechanism, a power applying lever, connected with said actuator piston, linkages connected at different points longitudinally of said lever, and extending in opposite directions to the steering wheel brake mechanisms and the brake mechanisms for the other wheels, said parts being constructed to apply the power of the actuator to all the connected brake mechanisms simultaneously to a predetermined extent as to each, an operator operated part connected with the valve mechanism of the actuator, means including linkage connected to said lever in alignment with the connection therefrom to the brake mechanisms other than the steering wheel brake mechanisms to enable the operator to apply his physical force to the brake mechanisms so connected with the operator operated part in addition to that of the actuator to compensate for increasing loads of the vehicle, without applying his physical force to the steering wheel brake mechanisms, or to apply said connected brake mechanisms by physical force alone in case of failure of power.

5. In brake mechanism for an automotive vehicle, the combination with brake mechanism for a plurality of pairs of wheels, including the steering wheels, a power actuator comprising a cylinder, a single piston therein, controlling valve mechanism therefor, and means for connecting a closed end of the actuator with sources of higher and lower pressures under the control of said valve mechanisms, means for connecting the piston of the actuator with all of said brake mechanisms, constructed to apply the power of the actuator to all of said brake mechanisms simultaneously to a predetermined extent as to each, an operator operated part connected with said controlling valve mechanism and operatively connected only with the brake mechanisms for wheels other than the steering wheels, to enable the operator to apply his physical force to the brake mechanisms connected with the operator operated part, in addition to that of the actuator, or to apply the said brake mechanisms by physical force alone in case of failure of power.

6. In brake mechanism for an automotive vehicle, the combination with brake mechanism for a plurality of pairs of wheels, including the steering wheels, a power actuator comprising a cylinder, a single piston therein, controlling valve mechanism therefor, and means for connecting a closed end of the actuator with sources of higher and lower pressures under the control of said valve mechanism, link and lever connections for connecting said piston with all of said brake mechanisms, the leverage of said connections for the steering wheel brake mechanisms and for the other of said brake mechanisms being arranged to effect the simultaneous application of all of said connected brake mechanisms to a predetermined extent as to each, an operator operated part, connected with the controlling valve mechanism for the actuator, said operator operated part being connected only with the brake mechanisms other than the steering wheel brake mechanisms to permit the operator to apply his physical force to the brake mechanisms connected with the operator operated part, in addition to that of the actuator to compensate for increasing loads of the vehicle, without applying his physical force to the brake mechanism for the front wheels, or to apply said connected brake mechanisms by physical force alone in case of failure of power.

7. In brake mechanism for an automotive vehicle, the combination with brake mechanism for a plurality of pairs of wheels, including the steering wheels, a power actuator comprising a cylinder, a single piston therein, controlling valve mechanism therefor, and means for connecting a closed end of the actuator with sources of higher and lower pressures under the control of said valve mechanism, a power applying lever, connected with said actuator piston, linkages connected at different points longitudinally of said lever, and extending in opposite direction to the steering wheel brake mechanisms and the brake mechanisms for the other wheels, said parts being constructed to apply the power of the actuator to all the connected brake mechanisms simultaneously to a predetermined extent as to each, an operator operated part connected with the valve mechanism of the actuator, the operator operated part being connected only with the brake mechanisms for wheels other than the steering wheels to enable the operator to apply his physical force to the brake mechanisms connected with the operator operated part, in addition to that of the actuator without applying his physical force to the steering wheel brake mechanisms, or to apply said connected brake mechanisms by physical force alone in case of failure of power.

8. In brake mechanism for an automotive vehicle, the combination with brake mechanism for a plurality of pairs of wheels, including the steering wheels, a power actuator comprising a cylinder, a single piston therein, controlling valve mechanism therefor, and means for connecting a closed end of the actuator with sources of higher and lower pressures under the control of said valve mechanism, a power applying lever operatively connected with said actuator piston, linkages connected to said lever at different points longitudinally thereof and extending in opposite directions to the steering wheel brake mechanisms and to the brake mechanisms for the other wheels, said parts being constructed to apply the power of the actuator to all the connected brake mechanisms simultaneously at predetermined leverages as to each, an operator operated part connected with the valve mechanism of the actuator, and means including linkage connected to said lever in substantial alignment with the connections therefrom to the brake mechanisms other than the steering wheel brake mechanisms, to enable the operator to apply his physical force to the brake mechanisms so connected with the operator operated part in addition to that of the actuator to compensate for increasing loads of the vehicle, without applying his physical force to the steering wheel brake mechanisms, or to apply said connected brake mechanisms by physical force alone in case of failure of power.

9. In brake mechanism for an automotive vehicle, the combination with brake mechanism for a plurality of pairs of wheels including the steering wheels, a power actuator comprising a cylinder, a single piston therein, controlling valve mechanism and means for connecting a closed end of the actuator with sources of higher and lower pressures under the control of said valve mechanism, means for connecting the actuator with all of said brake mechanisms, constructed to apply the power of the actuator to all of said brake mechanisms simultaneously to a predetermined extent as to each, an operator operated part operatively connected only with brake mechanisms for wheels other than the steering wheels to enable the operator to apply his physical force to the brake mechanisms connected with the operator operated part in addition to that of the actuator, or to apply the said brake mechanisms by physical force alone in case of failure of power.

10. In brake mechanism for an automotive vehicle provided with an internal combustion engine having a throttle controlled suction passage, the combination of brake mechanisms for a plurality of pairs of wheels of the vehicle including the steering wheels, a power actuator comprising a cylinder, a single piston therein, and controlling valve mechanism, means for connecting the cylinder on one side of the piston with the suction passage of the engine and with a source of higher pressure under the control of said valve mechanism, means for connecting the actuator with all of said brake mechanisms, constructed to apply the power of the actuator to all of said brake mechanisms simultaneously to a predetermined extent as to each, an operator operated part, operatively connected with the brake mechanisms for wheels other than the steering wheels, to enable the operator to apply his physical force to the brake mechanisms connected with the operator operated part in addition to that of the power actuator to compensate for increasing loads of the vehicle, without applying his physical force to the brake mechanisms for the steering wheels, or to apply said connected brake mechanisms by physical force alone in case of failure of power.

11. In brake mechanism for an automotive vehicle, the combination with brake mechanism for a plurality of pairs of wheels including the steering wheels, a power actuator comprising a cylinder, a single piston therein, controlling valve mechanism and means for connecting the actuator with sources of higher and lower pressures under the control of said valve mechanism, means for connecting the actuator with all of said brake mechanisms, for simultaneously applying the power of the actuator to all of said brake mechanisms simultaneously to a predetermined extent as to each, an operator operated part, operatively connected with the brake mechanisms for wheels other than the steering wheels, to enable the operator to apply his physical force to the brake mechanisms connected with the operator operated part in addition to that of the actuator to compensate for increasing loads of the vehicle, without applying his physical force to the brake mechanisms for the steering wheels, or to apply the said connected brake mechanisms by physical force alone in case of failure of power.

12. In brake mechanism for an automotive vehicle provided with an internal combustion engine having a throttle controlled suction passage, the combination of brake mechanisms for a plurality of pairs of wheels of the vehicle including the steering wheels, a power actuator comprising a cylinder, a single piston therein, and controlling valve mechanism, means for connecting the cylinder on one side of the piston with the suction passage of the engine and with a source of higher pressure under the control of said valve mechanism, means for connecting the actuator with all of said brake mechanisms for applying the power of the actuator to all of said brake mechanisms simultaneously to a predetermined extent as to each, an operator operated part, operatively connected with the brake mechanisms for wheels other than the steering wheels, to enable the operator to apply his physical force to the brake mechanisms connected to the operator operated part in addition to that of the power actuator to compensate for increasing loads of the vehicle, without applying his physical force to the brake mechanisms for the steering wheels, or to apply said connected brake mechanisms by physical force alone in case of failure of power.

13. In brake mechanism for an automotive vehicle, the combination with brake mechanism for a plurality of pairs of wheels including the steering wheels, a power actuator comprising a cylinder, a single piston therein, controlling valve mechanism and means for connecting a closed end of the actuator with sources of higher and lower pressures under the control of said valve mechanism, means for connecting the actuator with all of said brake mechanisms, for applying the force of the actuator to all of said brake mechanisms simultaneously to a predetermined extent as to each, by the minimum power of the actuator, an operator operated part, operatively connected with the brake mechanisms for wheels other than the steering wheels, to enable the operator to apply his physical strength to the brake mechanisms connected to the operator operated part to add the additional braking force necessary to stop the vehicle when heavily laden.

14. In brake mechanism for an automotive vehicle provided with an internal combustion engine having a throttle controlled suction passage, the combination of brake mechanisms for a plurality of pairs of wheels of the vehicle including the steering wheels, a power actuator comprising a cylinder, a single piston therein, and controlling valve mechanism, means for connecting the cylinder on one side of the piston with the suction passage of the engine and with a source of higher pressure under the control of said valve mechanism, means for connecting the actuator with all of said brake mechanisms, for applying the power of the actuator to all of said brake mechanisms simultaneously to a predetermined extent as to each, an operator operated part, operatively connected only with brake mechanisms for wheels other than the steering wheels, to enable the operator to apply his physical strength to the brake mechanisms connected to the operator operated part to add the additional braking force necessary to stop the vehicle when heavily laden.

15. In brake mechanism for an automotive vehicle, the combination with brake mechanism for a plurality of pairs of wheels including the steering wheels, a power actuator comprising a cylinder, a single piston therein, controlling valve mechanism and means for connecting the actuator with sources of higher and lower pressures under the control of said valve mechanism, means for connecting the actuator with all of said brake mechanisms, for applying all of the brake mechanisms simultaneously, an operator operated part, operatively connected with the brake mechanism for certain wheels less than the whole number of brake mechanisms connected with the power actuator, to enable the operator to apply his physical force to the brake mechanisms connected with the operator operated part in addition to that of the actuator, and to apply said brake mechanisms by physical force alone in case of failure of power.

16. In brake mechanism for an automotive vehicle provided with an internal combustion engine having a throttle controlled suction passage, the combination of brake mechanisms for a plurality of pairs of wheels of the vehicle including the steering wheels, a power actuator comprising a cylinder, a single piston therein, and controlling valve mechanism, means for connecting the cylinder on one side of the piston with the suction passage of the engine and with a source of higher pressure under the control of said valve mechanism, means for connecting the actuator with all of said brake mechanisms, for applying the power of the actuator to all of said brake mechanisms simultaneously, an operator operated part operatively connected with the brake mechanisms for certain wheels only, less than the whole number of brake mechanisms connected with the power actuator, to enable the operator to apply his physical force to the brake mechanisms connected with the operator operated part in addition to that of the actuator, and to apply the said brake mechanisms by physical force alone in case of failure of power.

17. In brake mechanism for an automotive vehicle, the combination with brake mechanisms for a plurality of pairs of wheels including the steering wheels, a power actuator comprising a cylinder, a single piston therein, controlling valve mechanism therefor, and means for connecting the actuator with sources of higher and lower pressures under the control of said valve mechanism, a floating power applying lever operatively connected with said actuator, linkages connected at different points longitudinally of said lever and extending in opposite directions respectively to the steering wheel brake mechanisms and to the brake mechanisms for the other wheels, said parts being constructed to apply the power of the actuator to all of the connected brake mechanisms simultaneously to a predetermined extent as to each, an operator operated part operatively connected with said lever for moving it in the same direction in which it is moved by the power stroke of the actuator and connected to said lever so as to enable the operator to apply his physical force in addition to the power of the actuator to the brake mechanisms for wheels other than the steering wheels, and to apply the brake mechanisms other than those for the steering wheels by physical force alone in case of failure of power, whereby said lever and its connections will compensate for wear of the braking surfaces and insure the application of all the brake mechanisms to the predetermined extent, and insure that the steering wheel brake mechanisms are not applied to a greater than the predetermined extent, when the physical force of the operator is added to the other brake mechanism.

18. In brake mechanism for an automotive vehicle provided with an internal combustion engine having a throttle controlled suction passage, the combination with brake mechanisms for a plurality of pairs of wheels including the steering wheels, a power actuator comprising a cylinder, a single piston therein, controlling valve mechanism therefor, and means for connecting the actuator with the suction passage of the engine and with the atmosphere under the control of said valve mechanism, a floating power applying lever operatively connected with said actuator, linkages connected at different points longitudinally of said lever and extending in opposite directions respectively to the steering wheel brake mechanisms and to the brake mechanisms for the other wheels, and constructed to apply the power of the actuator to all of the connected brake mechanisms simultaneously to a predetermined extent as to each, an operator operated part operatively connected with said lever for moving it in the same direction in which it is moved by the power stroke of the actuator and connected to said lever so as to enable the operator to apply his physical force in addition to that of the actuator to the brake mechanisms for wheels other than the steering wheels; and to apply the brake mechanisms other than those for the steering wheels by physical force alone in case of failure of power, whereby said lever and its connections will compensate for wear of the braking surfaces and insure the application of all the brake mechanisms to the predetermined extent, and insure that the steering wheel brake mechanisms are not applied to a greater than the predetermined extent when the physical force of the operator is added to the other brake mechanisms.

19. In brake mechanism for an automotive vehicle provided with an internal combustion engine having a throttle controlled suction passage, the combination of brake mechanisms for a plurality of pairs of wheels of the vehicle including the steering wheels, a power actuator comprising a cylinder, a piston therein, and controlling valve mechanism, means for connecting the cylinder with the suction passage of the engine, and with a source of higher pressure under the control of said valve mechanism, means for connecting the piston of the actuator with all of said brake mechanisms, constructed to apply the power of the actuator to all of said brake mechanisms, an operator operated part connected with said controlling valve mechanism, and operatively connected with certain brake mechanism to enable the operator to apply his physical force to the brake mechanisms connected with the operator operated part in addition to that of the power actuator, and to apply said brake mechanisms by physical force alone in case of failure of power without applying his physical force to the brake mechanisms for the other wheels.

20. In brake mechanism for an automotive vehicle having front and rear sets of brakes, a power actuator, a floating lever pivotally connected at one of its ends to the power transmitting or movable element of said actuator, connection to each of the sets of brakes extending respectively from the other end of the lever and from a point intermediate its ends, said latter connections being continued from said intermediate point to include both a manually operated member and a valve mechanism.

In testimony whereof we affix our signatures.

CALEB S. BRAGG.
VICTOR W. KLIESRATH.